(12) United States Patent  (10) Patent No.: US 7,393,015 B1
Gillespie et al.  (45) Date of Patent: Jul. 1, 2008

(54) VEHICLE SUB-FRAME ATTACHMENT APPARATUS AND METHOD

(75) Inventors: Paul Brian Gillespie, Powell, OH (US); Henry DiCato, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/764,435

(22) Filed: Jun. 18, 2007

(51) Int. Cl.
*B62D 21/00* (2006.01)
*B62D 24/00* (2006.01)

(52) U.S. Cl. .................. 280/781; 280/796; 280/797; 180/312; 296/29

(58) Field of Classification Search ............. 280/781, 280/796, 797, 798, 800; 180/312; 296/29
See application file for complete search history.

(56) References Cited

U.S. PATENT DOCUMENTS

| | | | | |
|---|---|---|---|---|
| 4,334,599 | A * | 6/1982 | Ritsema et al. | 188/73.45 |
| 4,531,761 | A * | 7/1985 | von Sivers | 280/785 |
| 5,040,917 | A * | 8/1991 | Camuffo | 403/408.1 |
| 5,139,361 | A | 8/1992 | Camuffo | |
| 5,244,325 | A * | 9/1993 | Knohl | 411/353 |
| 5,328,311 | A * | 7/1994 | Knohl | 411/353 |
| 5,409,283 | A * | 4/1995 | Ban | 296/35.1 |
| 5,711,711 | A * | 1/1998 | Schmidt, Jr. | 470/41 |
| 5,799,930 | A * | 9/1998 | Willett | 267/141.4 |
| 5,862,877 | A | 1/1999 | Horton et al. | |
| 5,899,498 | A * | 5/1999 | Horton | 280/781 |
| 5,980,174 | A * | 11/1999 | Gallagher et al. | 411/55 |
| 6,269,902 | B1 * | 8/2001 | Miyagawa | 180/312 |
| 6,361,096 | B2 * | 3/2002 | Kim | 296/35.1 |
| 6,543,828 | B1 * | 4/2003 | Gass | 296/35.1 |
| 6,869,090 | B2 * | 3/2005 | Tatsumi et al. | 280/124.109 |
| 7,086,688 | B2 * | 8/2006 | Edwards | 296/181.3 |
| 7,201,398 | B1 * | 4/2007 | Christofaro et al. | 280/781 |
| 7,261,365 | B2 * | 8/2007 | Dickson et al. | 296/190.07 |
| 7,275,296 | B2 * | 10/2007 | DiCesare | 29/464 |

* cited by examiner

*Primary Examiner*—Toan C To
(74) *Attorney, Agent, or Firm*—Rankin, Hill & Clark LLP; Mark E. Duell

(57) ABSTRACT

The present apparatus and method relates to improvements in stiffening elements within a vehicle body structure at a sub-frame attachment point. In a first embodiment of the improved apparatus and method, a long mounting pin is used in combination with a generally planar shear bulkhead. The pin fits partially into a channel within the shear bulkhead. The pin is welded, near its bottom, to a sub-frame mounting bracket. The long mounting pin extends to the upper part of the vehicle frame and is also welded thereto. The shear bulkhead abuts a generally middle section of the mounting pin and two additional welds are placed securing the mounting pin to the shear bulkhead.

10 Claims, 5 Drawing Sheets

Vertical
Lateral
Fore/Aft

VEHICLE SUB-FRAME ATTACHMENT APPARATUS AND METHOD

BACKGROUND OF THE INVENTION

In particular joints of a vehicle's suspension structure, stiffness and rigidity is desirable. One position where stiffness is desired is within the connection between the vehicle's rear sub-frame and the remainder of the vehicle body. Lack of stiffness in this joint is caused by the multi-component structure of the vehicle body adjacent to the connection point. Namely, the vehicle body is made of a combination of a sub-frame mounting bracket and a two part frame, the two parts being spaced apart and reinforced typically by a box-shaped internal bulkhead, as shown in FIGS. 2-4. In some vehicles, all of these parts are connected using a mounting pin which is projection welded to the sub-frame mounting bracket near the bottom of the pin (shown as crossed ovals) and MIG welded to the box-shaped internal bulkhead at the top of the pin. The box-shaped bulkhead is then welded to the upper part of the frame to complete the structure. Many welds are required to secure the joint. Namely, as illustrated in FIG. 2, the fore box bulkhead is spot welded (represented by black spots) to the frame in 12 places and the aft box bulkhead (not shown) in 10 places (FIG. 3 also shows typical weld positions on the fore bulkhead). Two MIG welds (open circles) are used to attach each bulkhead to each mounting pin.

In another vehicle joint configuration (not illustrated), the mounting pin is a through-pin that is used to directly connect the sub-frame mounting bracket to the upper part of the frame, but does not utilize any type of bulkhead. However, neither of these configurations provides a joint that is overly stiff and many welds are required to form the complete joint. What is desired is an apparatus that provides increased stiffness in fore/aft, lateral, and vertical directions in the vehicle body adjacent to the sub-frame connection point and that is simply installed with fewer welds.

BRIEF SUMMARY OF THE INVENTION

The present apparatus and method relate to an improvement in the means for securing elements within a vehicle body structure at a sub-frame attachment point. In a first embodiment of the improved apparatus and method, a long mounting pin is used and the box-shaped internal bulkhead is replaced with a shear, generally planar, bulkhead. The mounting pin is projection welded to the sub-frame mounting bracket of the body in the same position as other designs. The long mounting pin extends to the upper part of the frame of the body and is MIG welded thereto. The shear bulkhead includes a channel running from a bottom edge to a top edge, and a generally middle section of the mounting pin fits at least partially into this channel. Two additional MIG welds are used to secure the mounting pin at its generally middle section to the shear bulkhead. Additionally, the shear bulkhead is spot welded on each of its sides to the upper part of the frame and/or the lower part of the frame.

In a second embodiment of the improved apparatus and method, a mounting pin having a shorter length than the pin in the first embodiment is projection welded to the sub-frame mounting bracket. A shear bulkhead is again used between the upper and lower parts of the frame, but is taller than the shear bulkhead in the first embodiment of the apparatus. The shear bulkhead is MIG welded on its top to the upper part of the frame and is spot welded on its sides to the upper or lower part of the frame. Again, the mounting pin fits at least partially into a channel running from the bottom edge to the top edge of the shear bulkhead. The mounting pin is MIG welded to the shear bulkhead at a point above the generally middle section of the mounting pin.

The present apparatus and method improves the distribution of vehicle load to the frame and body. Also, improvements are made in fore-aft, lateral, and vertical stiffness in the overall sub-frame vehicle body joint. Compared to other devices, a smaller bulkhead is used in the present apparatus and method, thus, improving stiffness while decreasing vehicle weight. Additionally, the vehicle load is distributed through fixation points to three areas on the pin (bottom, generally middle and top) as opposed to just the bottom and top as in other devices. As a result, local loads are better resisted.

The shear bulkhead works especially well to improve vertical stiffness because instead of a pin applying a point load to a bulkhead as in other devices, a shear load is applied. The load is then distributed to the frame by the shear bulkhead. The resistance to fore/aft and lateral loads is improved by using the entire frame (upper and lower parts) cross-section versus the prior design only using the small cross-section of the internal bulkhead and lower frame section.

The apparatus is also installed using fewer welds than what are used in other devices. Typically in the other devices 22, spot welds and 4 MIG welds are required per sub-frame side. In the present apparatus and method, only 7 spot welds and 7 MIG welds are required per side of the sub-frame. These and other aspects of the apparatus and method are herein described in particularized detail with reference to the accompanying figures.

DETAILED DESCRIPTION OF THE INVENTION

Figure 1:
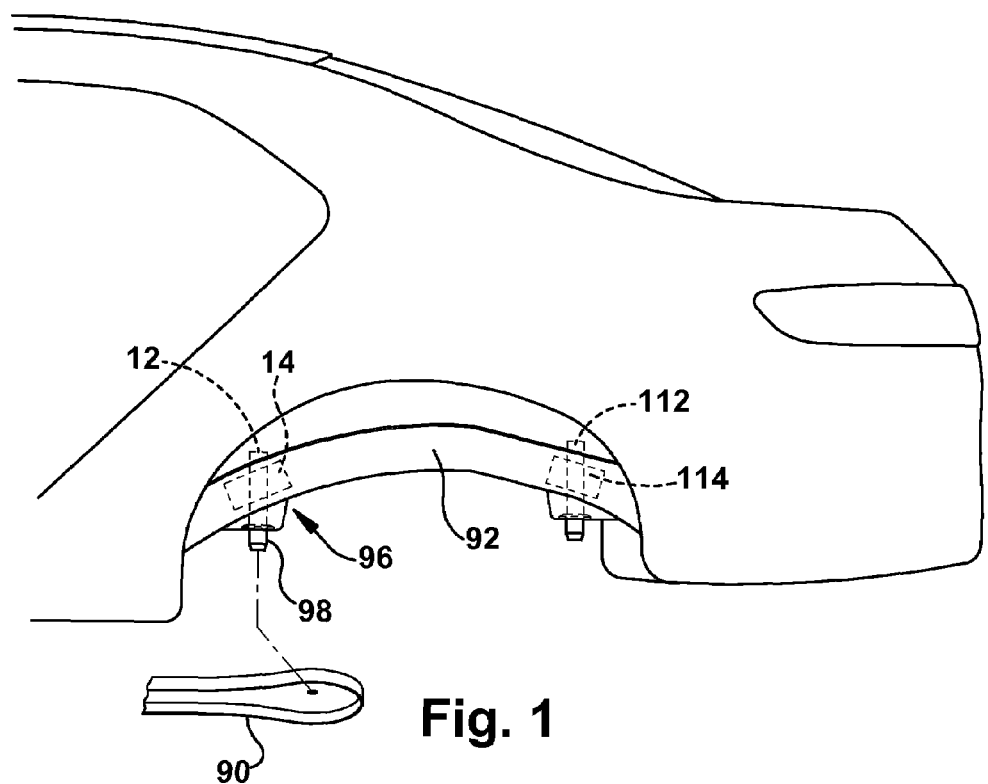
FIG. 1 is a schematic side view of a vehicle showing generally the vehicle frame and a sub-frame attachment point.
Figure 2:
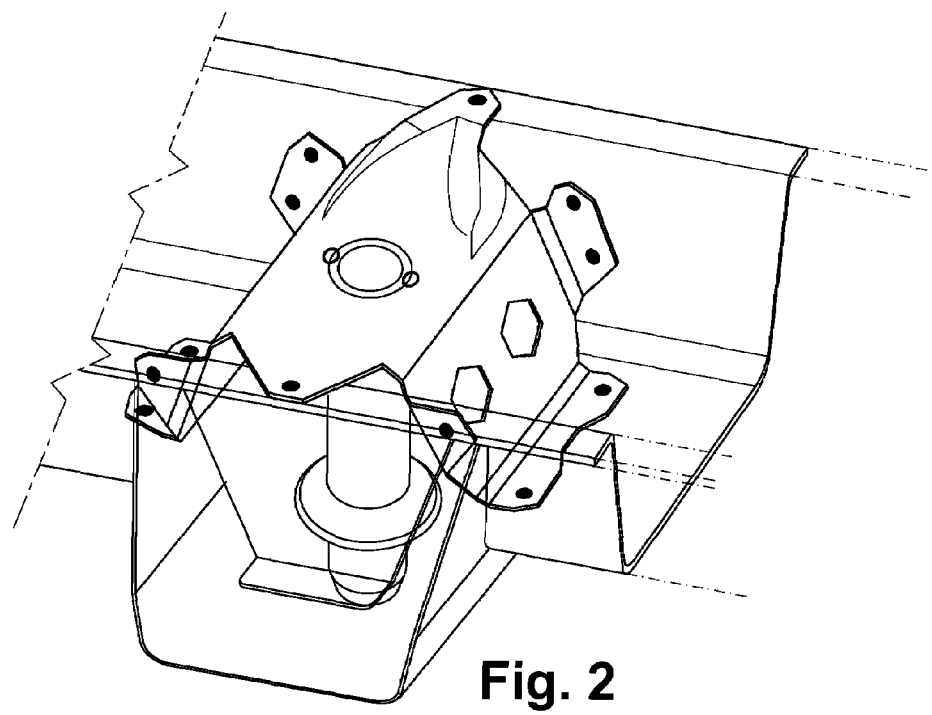
FIG. 2 is a perspective view of an attachment apparatus of others.
Figure 3:
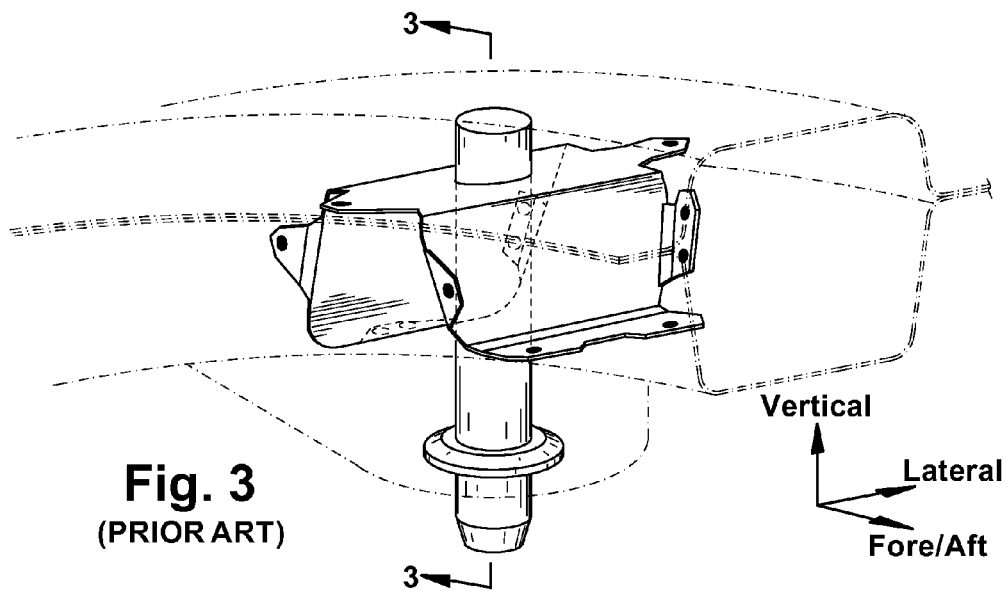
FIG. 3 is another perspective view of an attachment apparatus of others.
Figure 4:
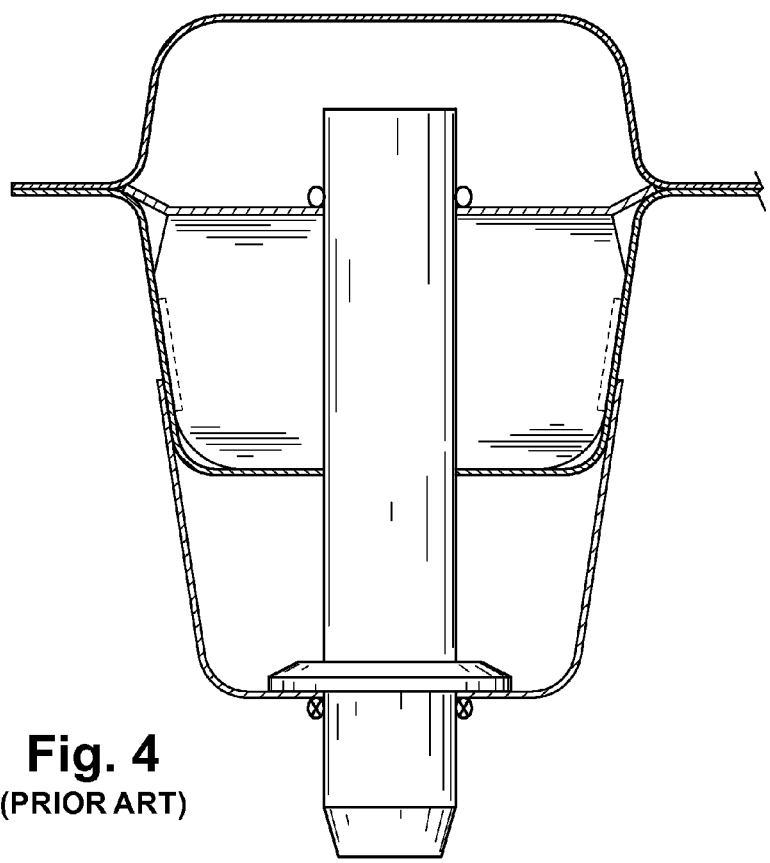
FIG. 4 is a cross sectional view of an attachment apparatus of others.
Figure 6:
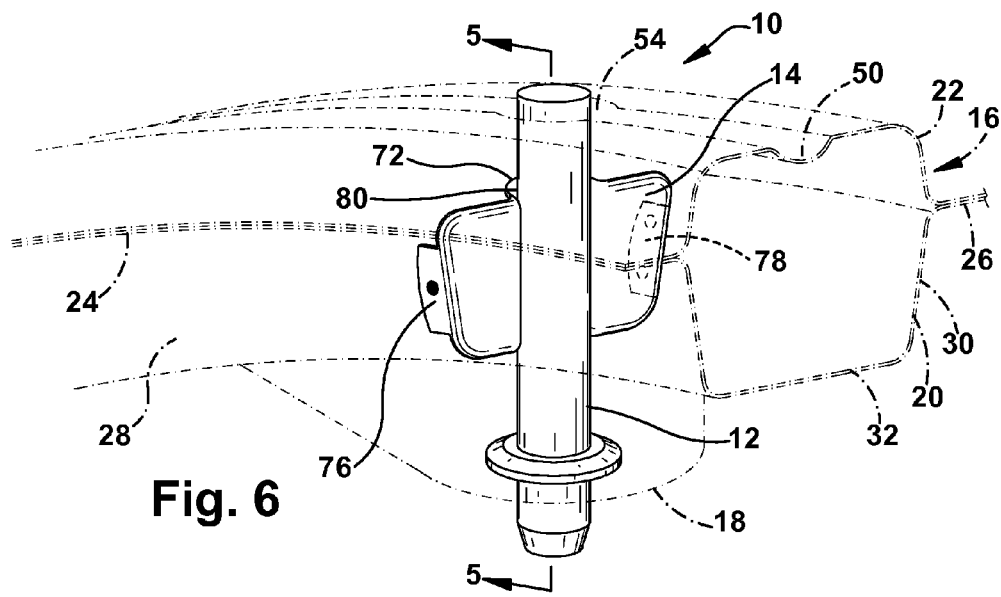
FIG. 6 is a perspective view of a first embodiment of applicant's attachment apparatus.
Figure 7:
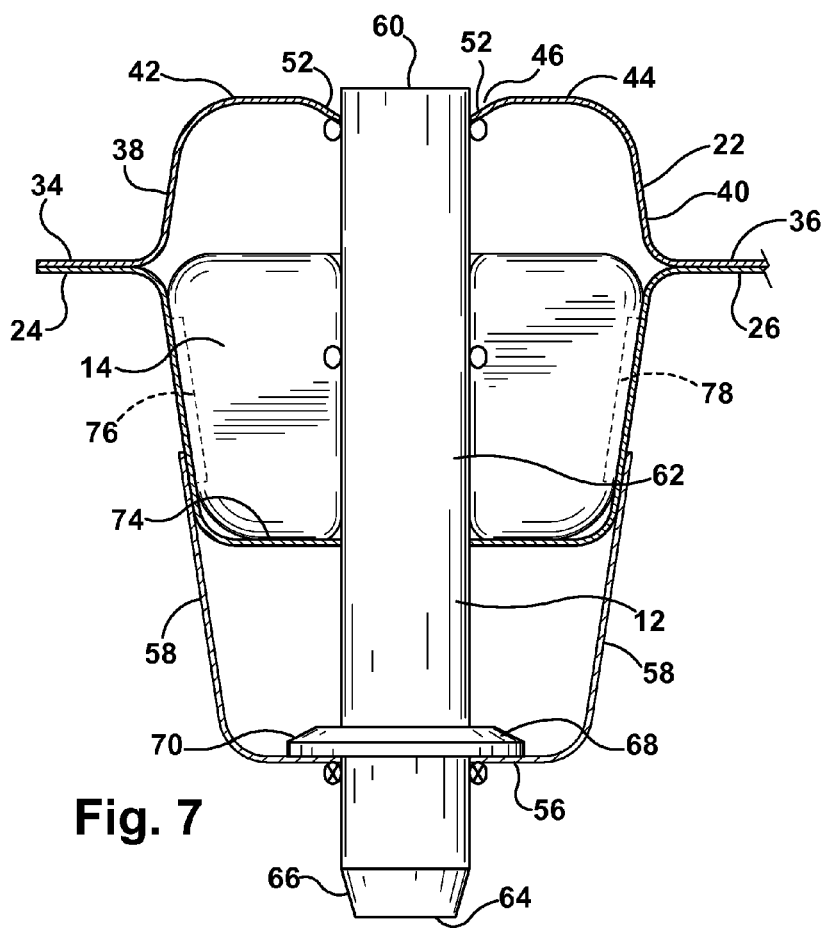
FIG. 7 is a cross sectional view of the attachment apparatus of the first embodiment.

Referring to the drawings, specifically FIGS. 1, 6 and 7, a preferred sub-frame attachment apparatus 10 is illustrated. As described in more detail below, the attachment apparatus 10 includes a pin 12 and a shear bulkhead 14 that provide the necessary stiffness at a sub-frame connection point on the vehicle's rear frame, within the vehicle body frame elements, namely an upper part of the frame 22, a lower part of the frame 20, and a sub-frame mounting bracket 18. Thus, an improved joint between the vehicle body and rear sub-frame 90 may be formed.

Referring to FIGS. 6 and 7, a portion of the rear frame 16 is shown and includes a lower part 20 and an upper part 22. The lower part of the frame 20 includes a first flange 24 and a second flange 26, a first sidewall 28, a second sidewall 30 and a base 32. The upper part 22 of the frame includes a first flange 34 and a second flange 36, a first sidewall 38 and a second sidewall 40, a first lateral portion 42 and a second lateral portion 44 and a channel 46.

Within a preferred form of the lower part of the frame 20, the base 32 is located between, and is generally perpendicular to, the first and second body sidewalls 28 and 30. The body sidewalls 28 and 30 have generally equivalent heights. The base 32 joins each of the first and second sidewalls 28 and 30 at their bottom ends. The base 32 and sidewalls 28 and 30, in combination, form an open topped duct. The base 32 also defines an aperture therein. The first flange 24 and second flange 26, respectively, extend from the top end of each body sidewall 28 and 30 in a direction away from the inside of the duct. Each of the first and second flanges 24 and 26 is generally parallel to the base 32.

Within a preferred form of the upper part of the frame 22, the channel 46 is located between the first lateral section 42 and the second lateral section 44 and at a lower height than the lateral sections. The channel 46 includes a flat bottom 50 and angled sides 52. The bottom 50 defines an aperture 54. The angled sides 52 extend from the bottom 50 to the lateral sections 42 and 44 of the upper part of the frame 22. The lateral sections 42 and 44 have equivalent widths and are generally parallel to the bottom 50 of the channel 46. The first sidewall 38 is located on an opposite side of the first lateral section 42 from the channel 46. Similarly, the second sidewall 40 is located on an opposite side of the second lateral section 44 from the channel 46. The sidewalls 38 and 40 are generally planar, but are curved at their upper and lower ends. Each sidewall 38 and 40 is generally perpendicular to the adjacent lateral section 42 and 44. The first flange 34 of the upper part of the frame 22 extends from the opposite end of the first sidewall 38 as the first lateral section 42, extends in an opposite direction compared to the first lateral section 42, and is generally parallel to the first lateral section 42. The second flange 36 of the upper part of the frame 22 extends from the opposite end of the second sidewall 40 as the second lateral section 44, extends in an opposite direction compared to the second lateral section 44, and is generally parallel to the second lateral section 44.

The sub-frame mounting bracket 18 includes a generally flat base 56 and at least one side wall 58 that is generally perpendicular to the base 56. The flat base 56 defines an aperture therein.

The mounting pin 12 is preferably formed from round stock and includes a top end 60, a generally middle section 62, and a bottom end 64. The bottom end 64 is beveled around its circumference 66. The pin 12 includes a collar 68 located approximately one quarter of the way between the bottom end 64 and top end 60. The collar 68 has an outer edge 70 that is beveled.

Figure 5:
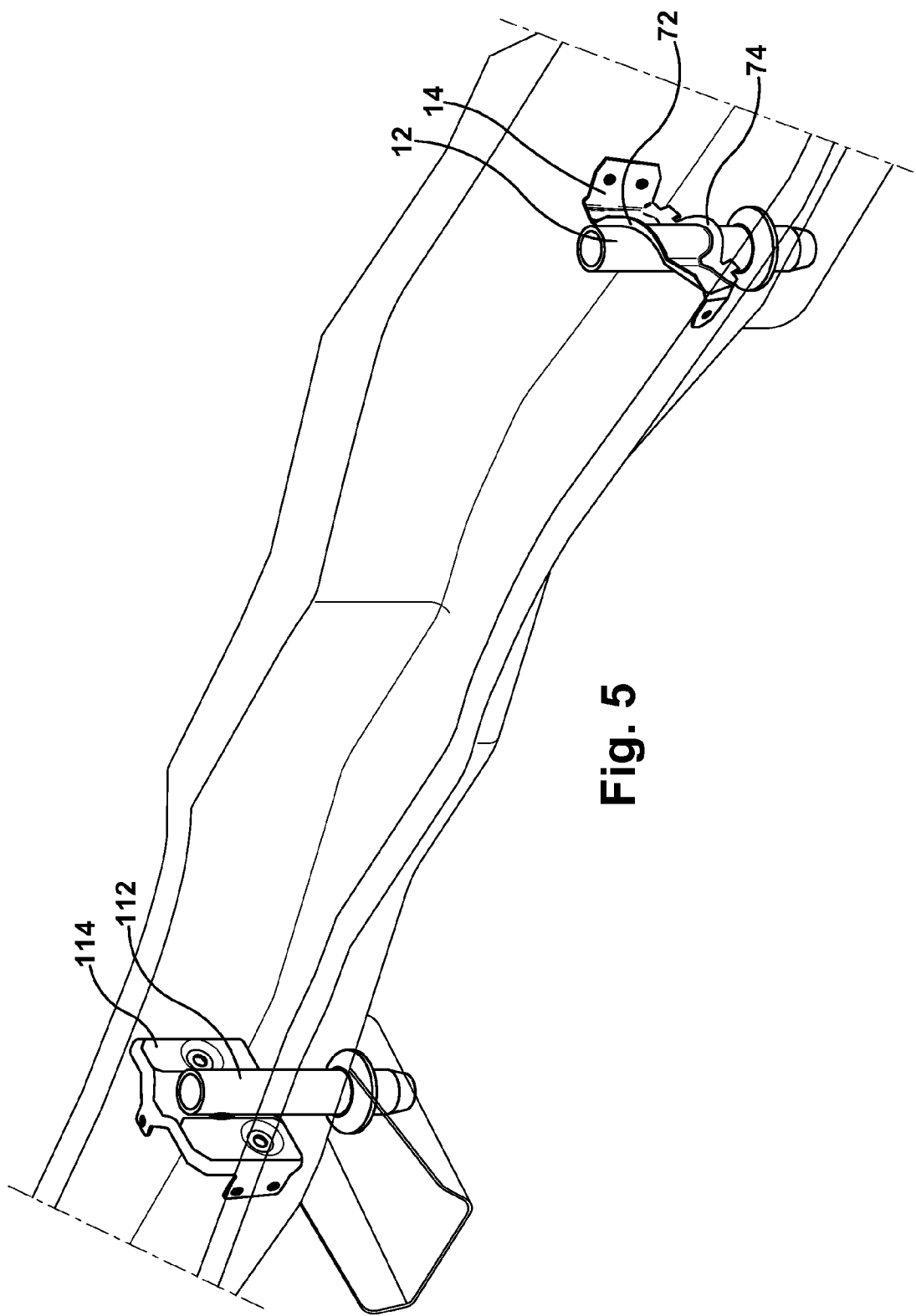
FIG. 5 is a schematic view of an attachment apparatus including both embodiments and the vehicle frame.

Referring to FIGS. 5-7, the shear bulkhead 14 is a generally planar element that includes generally perpendicular flanges at its top, bottom and side edges. The top flange 72, bottom flange 74, and at least one of the side flanges 76 and 78 preferably extend from the shear bulkhead 14 in a common direction which is away from the mounting pin when the apparatus 10 is assembled. The shear bulkhead 14 also includes an indented channel 80 (not in the same plane with the rest of the bulkhead) that extends from the bottom edge of the shear bulkhead 14 to the top edge. The channel 80 has a rounded configuration. The shear bulkhead 14 is shaped to fit within the surrounding frame 16. In a preferred first embodiment shown in FIGS. 6 and 7, the shear bulkhead 14 is symmetrical and is wider at its top than at its bottom. The shape of the shear bulkhead is limited somewhat by the constraints of the frame shape. The flanges add stiffness to the shear bulkhead. In a variation of the first embodiment, the bulkhead on one side of the channel 80 has a greater surface area than on the opposite side.

Referring to FIG. 1, the rear sub-frame 90, a portion of which is illustrated, is attached to the vehicle body 92 in four positions (only one position is shown). In each position, a mounting pin 12 and shear bulkhead 14 are used to provide the requisite stiffness in the vehicle body 92 at the attachment point 96.

Referring to FIGS. 6 and 7, the attachment apparatus 10 is assembled by placing the shear bulkhead 14 within the upper and lower parts of the frame 20 and 22. The side flanges 76 and 78 of the shear bulkhead 14 are spot welded (shown by shaded spots) to the lower part of the frame 20. Depending on the size of the side flanges, one or two welds are required per flange. The mounting pin 12 is then inserted into the frame 16 through the hole in the base 32 of the lower part of the frame 20. The mounting pin 12 is advanced until it reaches the top of the upper part of the frame 22. Preferably, a portion of the mounting pin 12 extends through the aperture 54 in the upper part 22 of the frame. The sub-frame mounting bracket 18 is then placed over the bottom end of the mounting pin 12 and advanced until contact with the collar 68 on the mounting pin 12 is made. The mounting pin 12 is MIG welded (shown by hollow ovals) near its top to the channel 46 of the upper part of the frame 22. The mounting pin 12 is MIG welded at its generally middle section 62 to the channel 80 in the shear bulkhead 14. The mounting pin 12 is projection welded (shown by crossed ovals) just below its collar 68 to the sub-frame mounting bracket 18. The upper and lower parts 20 and 22 of the frame are also welded together as known in the art.

Referring to FIG. 1, at the sub-frame attachment points 96, a portion of the sub-frame 90 includes an aperture fitted with a bushing and the bushing is pushed over the lower end 98 of the mounting pin 12. A bolt (not shown) is then secured to the mounting pin 12 in order to hold the sub-frame 90 to the frame 92.

Figure 8:
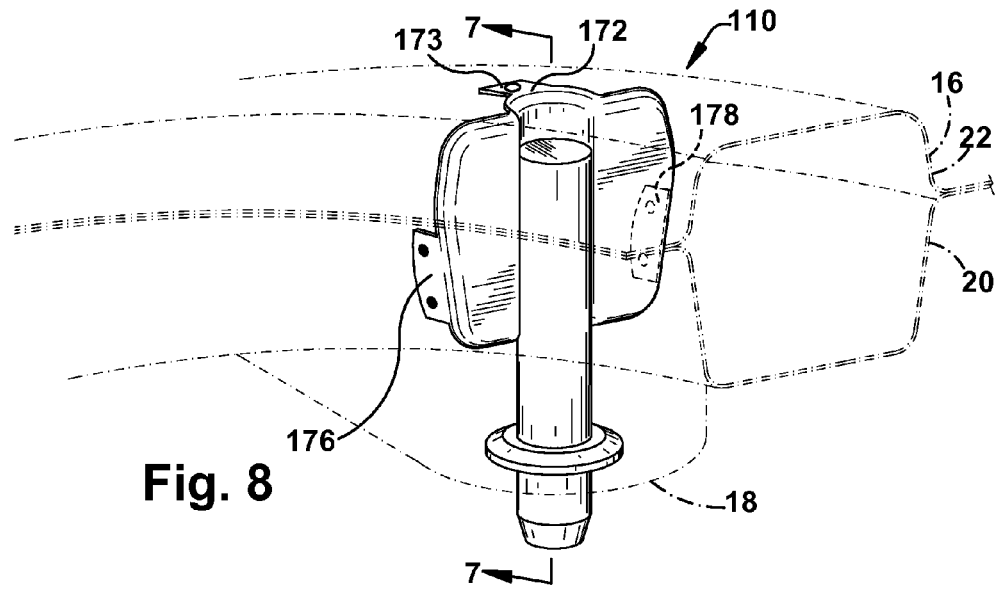
FIG. 8 is a perspective view of an attachment apparatus of a second embodiment.
Figure 9:
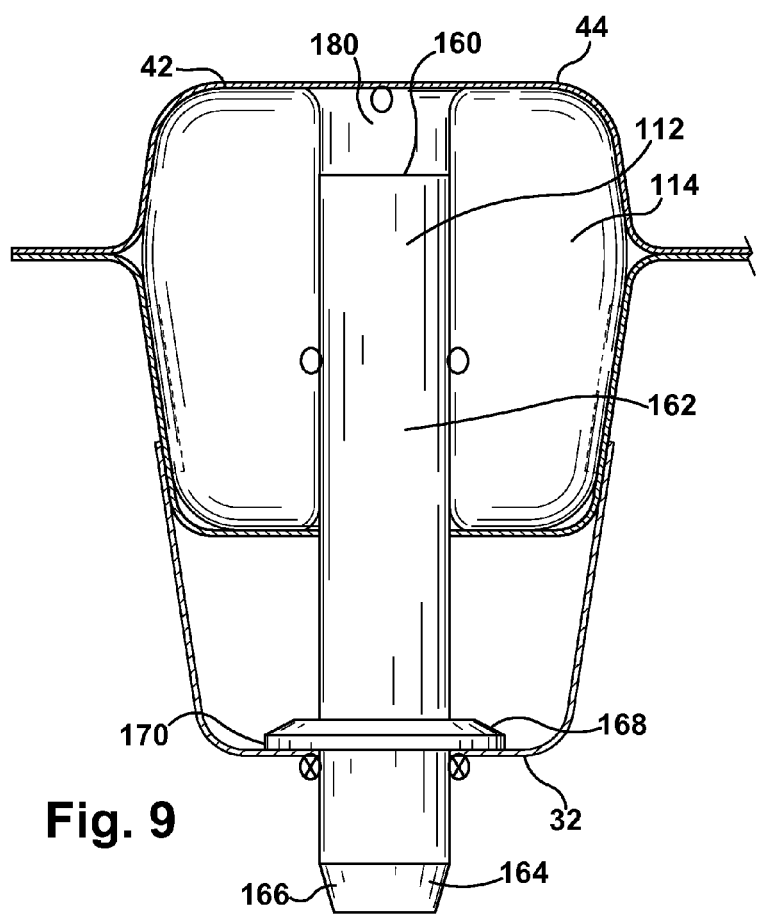
FIG. 9 is a cross sectional view of the attachment apparatus of the second embodiment.

Referring to FIGS. 8 and 9, a second embodiment of the apparatus is shown. Elements that are the same as within the first embodiment are referred to with the same reference numbers.

The mounting pin 112 of the apparatus 110 is preferably formed from round stock and includes a top end 160, a generally middle section 162, and a bottom end 164. The mounting pin 112 within the second embodiment of the apparatus is shorter than the mounting pin 12 in the first embodiment of the apparatus. The bottom end 164 is beveled around the circumference 166. The pin 112 includes a collar 168 located about one quarter of the way between the bottom end 164 and top end 160. The collar 168 has an outer edge 170 that is beveled.

The shear bulkhead 114 is a generally planar element that includes perpendicular flanges at its top, bottom and side edges. The top flange 172, bottom flange 174, and side flanges 176 and 178 preferably all extend from the shear bulkhead 114 in a common direction. The shear bulkhead 114 also includes a weld tab 173 extending from the top flange 172. The shear bulkhead 114 also includes an indented channel 180 that extends from the bottom edge of the shear bulkhead 114 to the top edge. The shear bulkhead 114 of the second embodiment is taller than the shear bulkhead 14 of the first embodiment of the apparatus and is shaped to fit within the surrounding frame 16. Within the second embodiment, the shear bulkhead 114 preferably has a width that is more narrow at is bottom than at its generally middle section and top, although other shapes are possible as shown in FIG. 5. Additionally, the width of the shear bulkhead is preferably narrower at the top than at its generally middle section.

Referring to FIGS. 8 and 9, the attachment apparatus 110 is assembled with the shear bulkhead 114 placed inside of the upper and lower parts of the frame 16. The shear bulkhead 114 extends up to the lower side of the first and second transverse portions 42 and 44 of the upper part of the frame 22. The side flanges 176 and 178 are spot welded to the sides of the upper or lower part of the frame and the welding tab 173 is MIG welded to the upper part of the frame 22. The mounting pin 112 is then slid into the hole in the base of the lower part of the frame 20 and advanced until the top of mounting pin 112 has reached about three quarters of the height of the shear bulkhead 114. The mounting pin 112 fits into the channel 180 of the shear bulkhead 114. The mounting pin 112 is then MIG welded to the shear bulkhead 114 above the generally middle section 162 of the mounting pin 112. The sub-frame mounting bracket 18 is then placed over the lower end of the mounting pin 112 and moved toward the frame 16 until the collar 168 on the mounting pin stops upward movement. The mounting pin 112 is then projection welded just below the collar 168 to the sub-frame mounting bracket 18.

Referring to FIG. 1, an apparatus of the first embodiment is used where the front part of the rear sub-frame attaches to the vehicle and an apparatus of the second embodiment attaches to the rear part of the rear sub-frame of the vehicle.

In the first embodiment, several different configurations of the frame are possible depending upon the location of the connection point on the vehicle body. Each configuration though has at least an upper surface that defines an aperture whereby the mounting pin is welded to the upper part of the frame adjacent to the aperture. Additionally, each configuration of the frame has two side surfaces whereby the side flanges on the shear bulkhead are welded to the frame side surfaces. Correspondingly, the shear bulkhead 14 has varying shapes because the shear bulkhead shape matches, in general, the shape of the inside of the frame.

Also, in the second embodiment, several different configurations of the frame are possible depending upon location on the vehicle body. Each configuration of the frame, though, has at least a generally flat surface whereby the welding tab on the shear bulkhead is weldable to this flat surface of the upper part of the frame. Additionally, each configuration of the frame has two side surfaces whereby the side flanges on the shear bulkhead are weldable to the side surfaces.

In the first and second embodiments, several different configurations of the sub-frame mounting bracket are possible depending upon the location on the vehicle body. Each configuration though has at least a flat surface that defines an aperture whereby the mounting pin is welded to the flat surface just below the mounting pin collar.

In the first and second embodiments, alternatively, either a round mounting pin or hex mounting pin may be used. A portion of, or the entire mounting pin may be hollow.

Although the apparatus and method have been shown and described with reference to certain preferred and alternate embodiments, the apparatus and method are not limited to these specific embodiments. Minor variations and insubstantial differences in the various combinations of materials and methods of application may occur to those of ordinary skill in the art while remaining within the scope of the apparatus and method as claimed and equivalents.

What is claimed is:

1. An apparatus for stiffening a vehicle body in a position where a vehicle sub-frame attaches to the vehicle body comprising:
   a vehicle frame having an upper part of the frame attached to a lower part of the frame;
   a sub-frame mounting bracket;
   a mounting pin having a top, generally middle section, and bottom, the mounting pin for use in rigidly securing the frame to the sub-frame mounting bracket; and
   a shear bulkhead configured between the top of the frame and the bottom of the sub-frame mounting bracket, the shear bulkhead including a channel for receiving said mounting pin,
   wherein the mounting pin is welded to the upper part of the frame and the sub-frame mounting bracket, and
   wherein the mounting pin is welded at its generally middle section to the shear bulkhead providing in combination with the other welds, overall stiffness within the frame and mounting bracket.

2. The apparatus of claim 1, wherein the shear bulkhead is generally planar, but includes said non-planar channel which runs from a lower edge of the shear bulkhead to an upper edge of the shear bulkhead.

3. The apparatus of claim 2, wherein the mounting pin is partially enclosed by the channel in the shear bulkhead and the mounting pin partially protrudes from the channel in the shear bulkhead.

4. The apparatus of claim 1, wherein the shear bulkhead further includes a top flange and first and second side flanges that are transverse to the plane of the shear bulkhead and that are welded to the frame.

5. The apparatus of claim 1, wherein the shear bulkhead is shaped to match the interior shape of the frame.

6. An apparatus for stiffening a vehicle body in a position where a vehicle sub-frame is attached to the vehicle body comprising:
   a vehicle frame having an upper frame part attached to a lower frame part;
   a sub-frame mounting bracket;
   a mounting pin having a top, generally middle section, and bottom, the mounting pin for use in rigidly securing the upper part of the frame to the sub-frame mounting bracket; and
   a shear bulkhead configured between top of the upper part of the frame and the bottom of the sub-frame mounting bracket, the shear bulkhead including a channel for receiving said mounting pin,
   wherein the mounting pin is welded to the sub-frame mounting bracket,
   wherein the shear bulkhead is welded at its top to the upper part of the frame; and
   wherein the mounting pin is welded above its generally middle section to the shear bulkhead.

7. The apparatus of claim 6, wherein the shear bulkhead is generally planar, but includes said non-planar channel which runs from a lower edge of the shear bulkhead to an upper edge of the shear bulkhead.

8. The apparatus of claim 1, wherein the mounting pin is partially enclosed by the channel in the shear bulkhead and the mounting pin partially protrudes from the channel in the shear bulkhead.

9. The apparatus of claim 1, wherein the shear bulkhead includes a top flange with a welding tab that is welded to the upper part of the frame and first and second side flanges that are welded to the frame.

10. A method for stiffening a vehicle body at a sub-frame attachment point comprising the steps of:
    providing a mounting pin and a shear bulkhead including a channel for receiving the mounting pin,
    placing the shear bulkhead between an upper part of the frame of the vehicle and a sub-frame mounting bracket on a vehicle body;
    fitting the mounting pin into the channel within the sheer bulkhead;
    MIG welding the mounting pin to the upper part of the frame and projection welding the mounting pin to the sub-frame mounting bracket;
    MIG welding the mounting pin to the shear bulkhead; and
    attaching a subframe to a bottom end of the mounting pin.

* * * * *